United States Patent
Kong et al.

[11] Patent Number: 6,014,353
[45] Date of Patent: Jan. 11, 2000

[54] DISK MAGAZINE LOADING/EJECTING APPARATUS OF DISK PLAYER

[75] Inventors: Gyeng-yeoul Kong; Won-youl Bae, both of Suwon, Rep. of Korea

[73] Assignee: Samsung Electronics Co., Ltd., Rep. of Korea

[21] Appl. No.: 08/943,706

[22] Filed: Oct. 3, 1997

[30] Foreign Application Priority Data

Oct. 4, 1996 [KR] Rep. of Korea ............... 96-43962

[51] Int. Cl.[7] ..................... G11B 17/22; G11B 17/04
[52] U.S. Cl. ................................. 369/36; 369/178
[58] Field of Search ..................... 360/132, 133; 369/36, 178, 77.1, 75.1, 77.2

[56] References Cited

U.S. PATENT DOCUMENTS

| | | | |
|---|---|---|---|
| 3,823,948 | 7/1974 | Jenkins | 279/9 B |
| 3,860,248 | 1/1975 | Hunt et al. | 274/1 R |
| 4,162,007 | 7/1979 | Bothun et al. | 206/444 |
| 5,191,569 | 3/1993 | Kurosawa et al. | 369/38 |
| 5,280,463 | 1/1994 | Okajima et al. | 369/36 |

*Primary Examiner*—Stuart S. Levy
*Assistant Examiner*—Tod Kupstas
*Attorney, Agent, or Firm*—Dilworth & Barrese

[57] ABSTRACT

A magazine loading and ejecting apparatus of a disk player for loading and ejecting a magazine accommodating a plurality of disks in and out of a disk player main body, including: a stopper having a locking protrusion and being installed in the disk player main body to be capable of reciprocating perpendicular to a direction the magazine is inserted; a cam groove formed on the magazine, the cam groove having a first angled portion along which the locking protrusion slides in contact therewith when the magazine is inserted in the disk player main body and a locking groove into which the locking protrusion is inserted and locked when the magazine is completely inserted into the disk player main body; a spring which elastically biases the stopper in one direction; and an ejection unit which ejects the magazine from the disk player main body.

12 Claims, 12 Drawing Sheets

6,014,353

DISK MAGAZINE LOADING/EJECTING APPARATUS OF DISK PLAYER

BACKGROUND OF THE INVENTION

1. Field of the Invention

The present invention relates to an apparatus for loading and ejecting a magazine accommodating a plurality of disks in and out of a disk player.

2. Description of the Related Art

A magazine in which a plurality of disks are inserted and stored is used in a disk player to reproduce one of the stored disks. The magazine is inserted into a disk player main body. When completely inserted, the magazine is supported by a stopper which is operated by a sensor to thus prevent the magazine from being ejected from the disk player main body. When ejecting the magazine, the stopper returns to the initial position through manipulation by a user and then the magazine is ejected out of the disk player by a spring which presses against the magazine.

In a disk player according to the conventional technology, a sensor for detecting whether a magazine is inserted into an insertion opening is required in loading the magazine in a disk player main body. Also, an additional dumping mechanism such as a hydraulic damper is needed to prevent abrupt ejection of the magazine by the spring during ejection of the magazine. Therefore, there are disadvantages in that the entire system of the disk player is complicated.

SUMMARY OF THE INVENTION

To overcome the above problems, it is an objective of the present invention to provide an apparatus for loading and ejecting a magazine in and out of a disk player having an improved main body structure so that the structure of the disk player is simplified.

Accordingly, to achieve the above objective, there is provided a magazine loading and ejecting apparatus of a disk player for loading and ejecting a magazine accommodating a plurality of disks in and out of a disk player main body, including: a stopper having a locking protrusion and being installed in the disk player main body to be capable of reciprocating perpendicular to the direction the magazine is inserted; a cam groove formed on the magazine, the cam groove having a first angled portion along which the locking protrusion slides in contact therewith when the magazine is inserted in the disk player main body and a locking groove into which the locking protrusion is inserted and locked when the magazine is completely inserted into the disk player main body; a spring which elastically biases the stopper in one direction; and an ejection unit which ejects the magazine from the disk player main body.

It is preferred in the present invention that the ejection unit includes: a motor; a slide rack member, installed in the disk player main body to be capable of reciprocating by a driving force of the motor, for moving the stopper to enable the locking protrusion to be separated from the locking groove; an ejector, installed in the disk player main body to be capable of reciprocating in the directions the magazine is inserted and ejected, and retreating by being pushed by the leading edge of the inserted magazine in the direction the magazine is inserted; and an ejecting spring for elastically biasing the ejector in the direction the magazine is ejected.

Also, it is preferred in the present invention that the cam groove further includes a second angled portion along which the locking protrusion slides in contact therewith when the magazine is ejected from the disk player main body. When the locking protrusion slides along the first angled portion of the cam groove during the insertion of the magazine, the stopper moves in the reverse direction with resect to the one direction and is inserted in the locking groove by a restoring force of the spring. When the locking protrusion slides along the second angled portion during the ejection of the magazine, the stopper moving in the one direction so that the magazine is ejected slowly.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE MENTION

Figure 1:
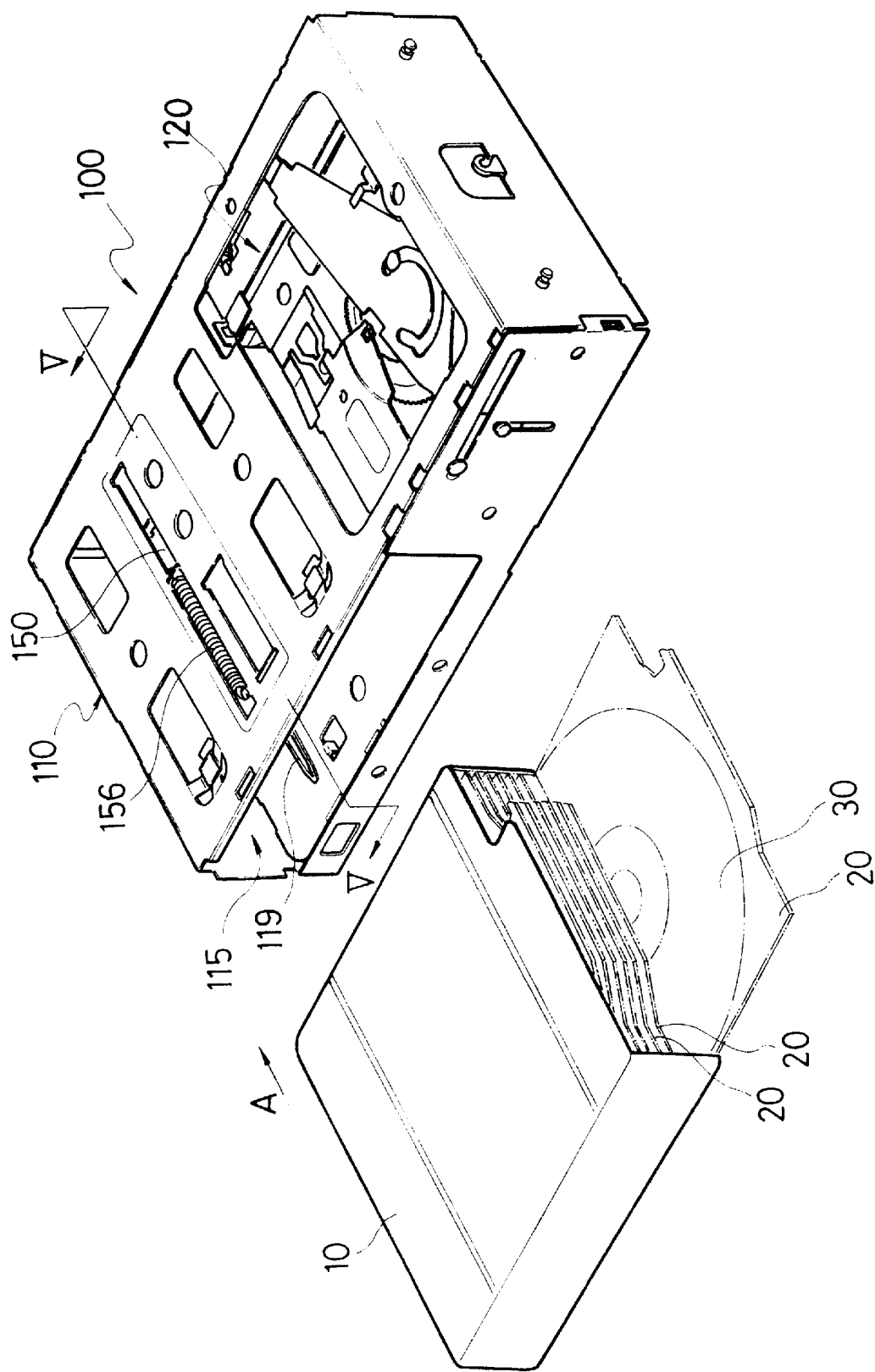
FIG. 1 is a perspective view illustrating a disk player adopting a magazine loading/ejecting apparatus according to a preferred embodiment of the present invention.

The disk player shown in FIG. 1 includes a disk player main body 100 and a magazine 10 having a plurality of trays 20 stacked to hold disks 30. The disk player main body 100 includes a fame 110 having an insertion opening 115 for receiving the magazine 10 and a reproducing mechanism 120 installed inside the frame 110 for reproducing information recorded on a disk 30. A guide rail 119 for guiding the insertion of the magazine 10 is formed on the frame 110 in a disk insertion direction "A" as shown FIG. 2. A guide groove 11 is formed on the bottom surface of the magazine 10 and the guide rail 119 inserts therein as shown in FIG. 3.

The magazine 10 is loaded and ejected in and out of the disk player main body 100 by the magazine loading/ejecting apparatus according to the present invention. The magazine loading/ejecting apparatus includes a retention unit for maintaining the magazine 10 inserted in the disk player main body 100 and an ejection unit for ejecting the magazine from the disk player main body 100.

Figure 2:
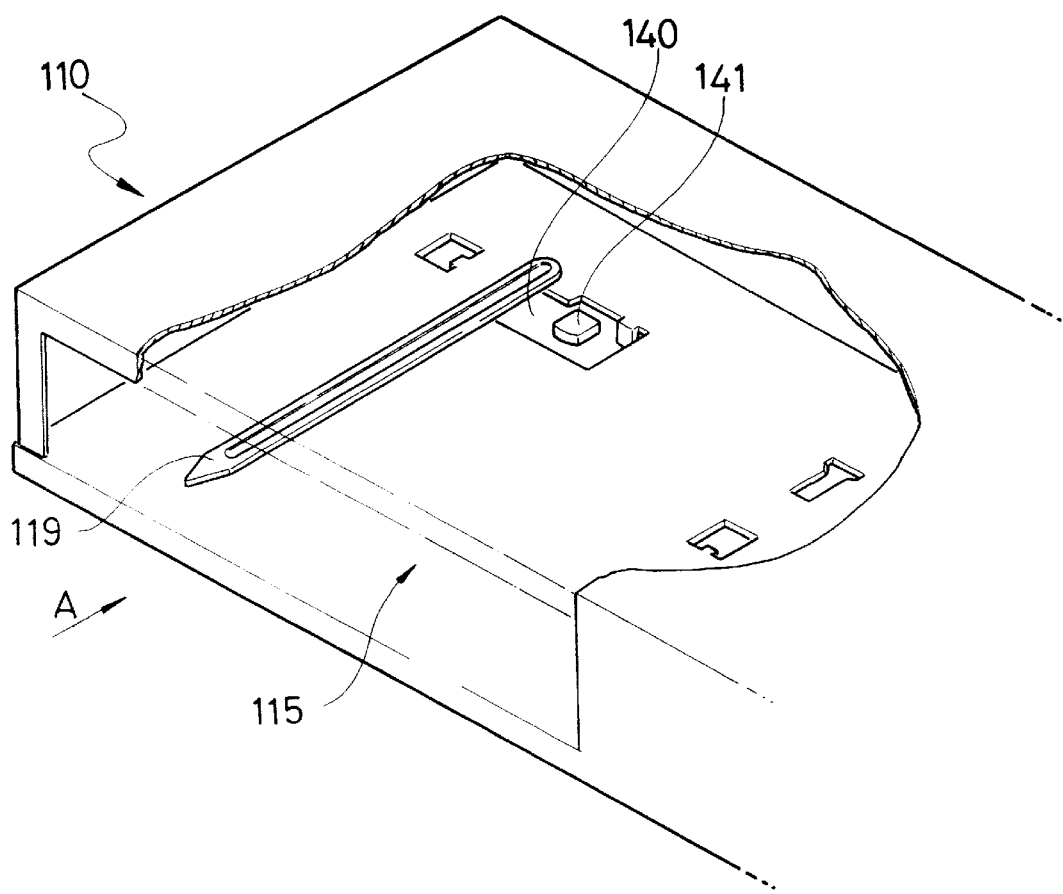
FIG. 2 is a perspective view illustrating the disk player by cutting away a portion of the frame shown in FIG. 1.
Figure 3:
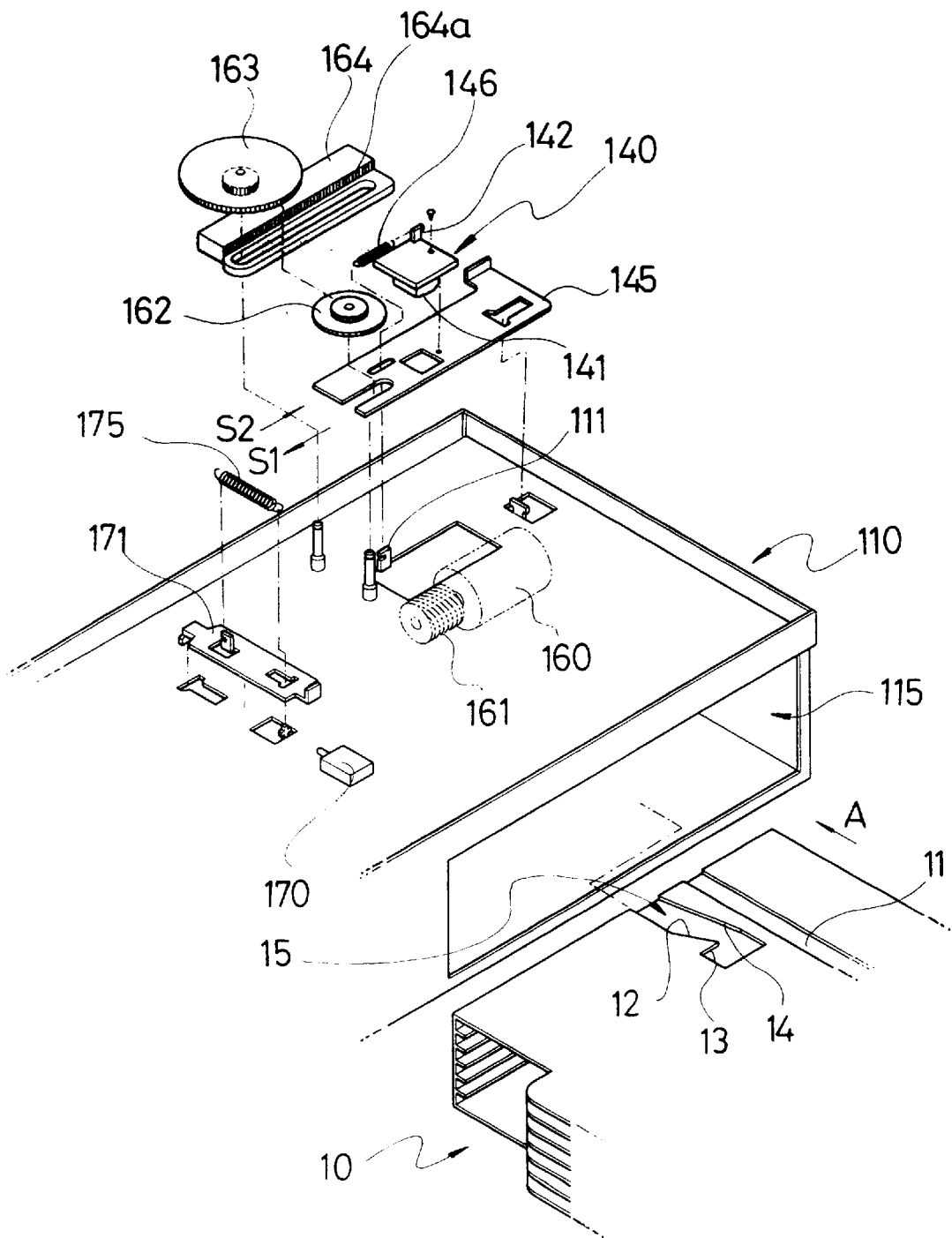
FIG. 3 is an exploded perspective view illustrating the disk player and the magazine shown in FIG. 1, viewed from the bottom thereof.
Figure 4:
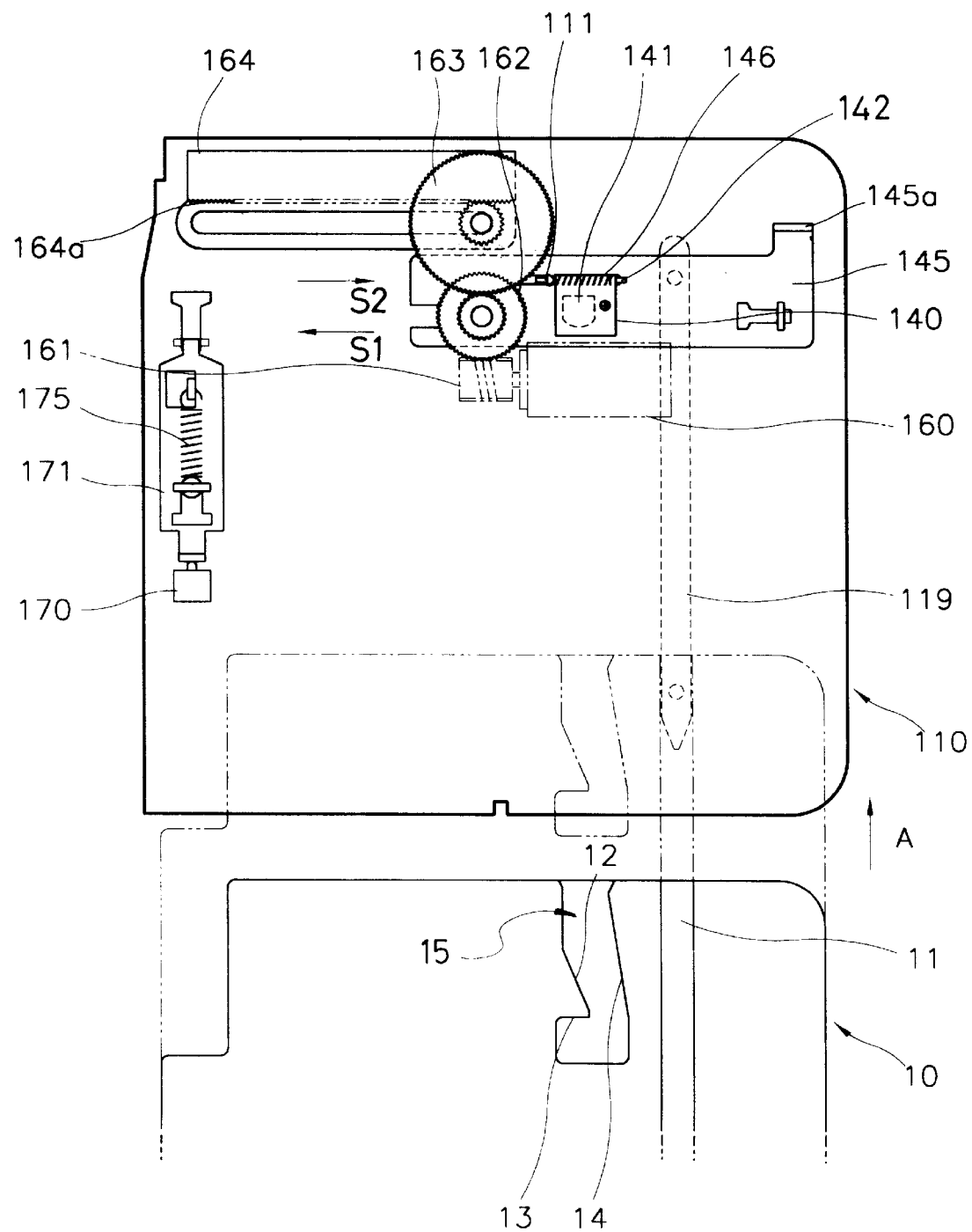
FIG. 4 is a bottom view of the disk player and the magazine shown in FIG. 1.

Referring to FIGS. 3 and 4, the retention unit includes a slide member 145 installed on the bottom surface of the frame 110 to be capable of reciprocating along directions indicated by arrows S1 and S2 which is perpendicular to the magazine inserting direction A and a stopper 140 fixed to the slide member 145. The stopper 140 is elastically biased in direction S1 by a spring 146 coupled between a hook 142 formed on the stopper 140 and another hook 111 formed on the frame 110. As shown in FIG. 2, a locking protrusion 141 is formed protruding inward from the frame 110.

Also, a cam groove 15 is formed at the bottom surface of the magazine 10 and coupled with the locking protrusion 141 of the stopper 140. The cam groove 15 has a first angled portion 12 and a second angled portion 14 which are angled with respect to the magazine insertion direction A. A locking groove 13 for locking the locking protrusion 141 is formed on the first angled portion 12 as will be described later.

Figure 5:
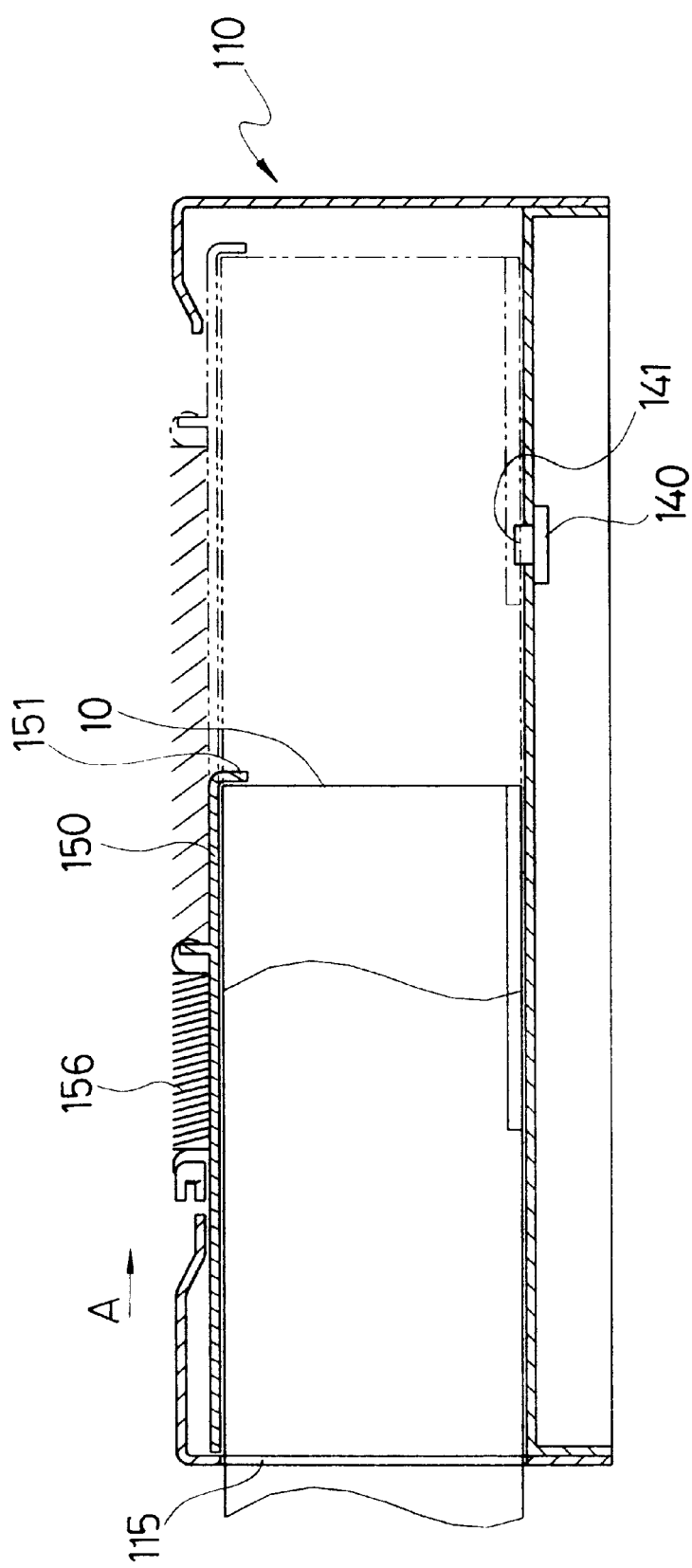
FIG. 5 is a sectional view of the disk player taken along line V—V in FIG. 1.

As shown in FIGS. 1 and 5, the ejection unit includes an ejector 150 which is installed at the frame 10 to be capable of reciprocating in the magazine insertion direction A. The ejector 150 is elastically biased by an ejecting spring 156 in a magazine ejecting direction. A detent 151 by which the inserted magazine 10 is stopped by contacting the leading edge of the magazine is formed to the rear end of the ejector 150.

Referring to FIG. 3, a slide rack member 164 having a rack 164a is installed at the bottom surface of the frame 10 to be capable of sliding in the same direction as the slide member 145. The rack 164a is engaged with a pinion 163 which is meshed with a worm wheel 162. The worm wheel 162 is engaged with a worm 161 fixed to an output shaft of a motor 160.

Also, a switch 170 and a switch operating member 171 are installed on the frame 110. The switch operating member 171 is installed to be capable of reciprocating and is elastically biased toward the switch 170 by a spring 175.

The operation of inserting and ejecting of the magazine into and out of a disk player equipped with the magazine loading/ejecting apparatus according to the present invention will now be described.

Referring to FIGS. 3 and 4, when the magazine 10 is inserted into the disk player main body 100 through the insertion opening 115, the guide rail 119 couples with the guide groove 11 formed on the bottom surface of the magazine 10 as shown by the imaginary lines and concurrently guides the insertion of the magazine 10. At this time, the leading edge of the inserted magazine 10 contacts the detente 151 of the ejector 150 to retract the ejector 150 in the magazine insertion direction (FIG. 5). Simultaneously, the leading edge of the magazine 10 pushes the switch operating member 171 to retreat so that the switch operating member 171 moves away from the switch 170.

Figure 6:
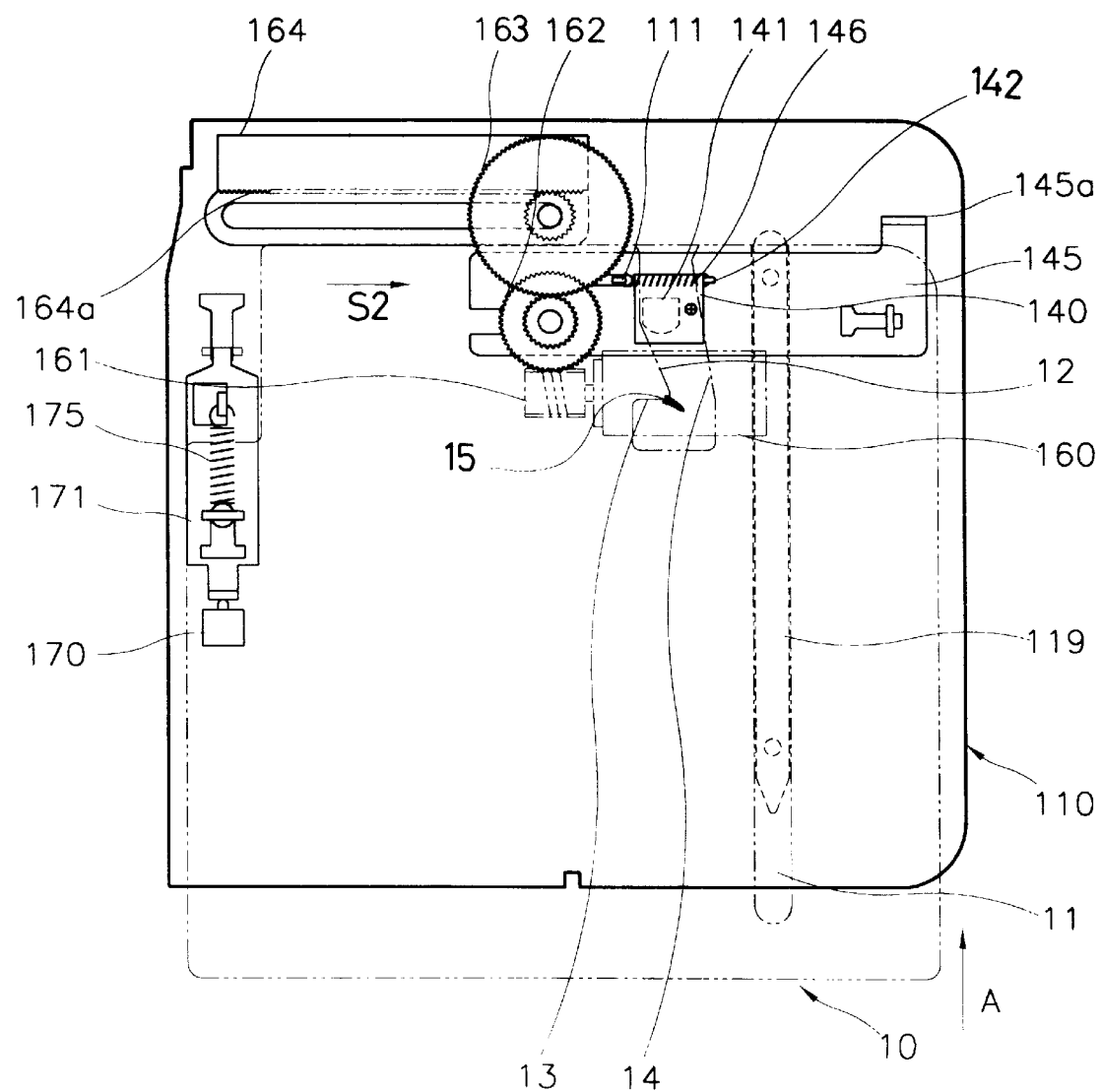
FIGS. 6 through 12 are bottom views showing the disk player and the magazine for explaining the operations of inserting and ejecting the magazine in and out of the disk player according to the present invention.

As the magazine 10 is inserted, as shown in FIG. 6, the first angled portion 12 of the cam groove 15 formed on the magazine 10 contacts the locking protrusion 141 of the stopper 140. As the magazine 10 is further inserted, the locking protrusion 141 slides along the first angled portion 12, and accordingly, the stopper 140 and the slide member 145 coupled with the stopper 140 are moved in the direction S2.

Figure 7:
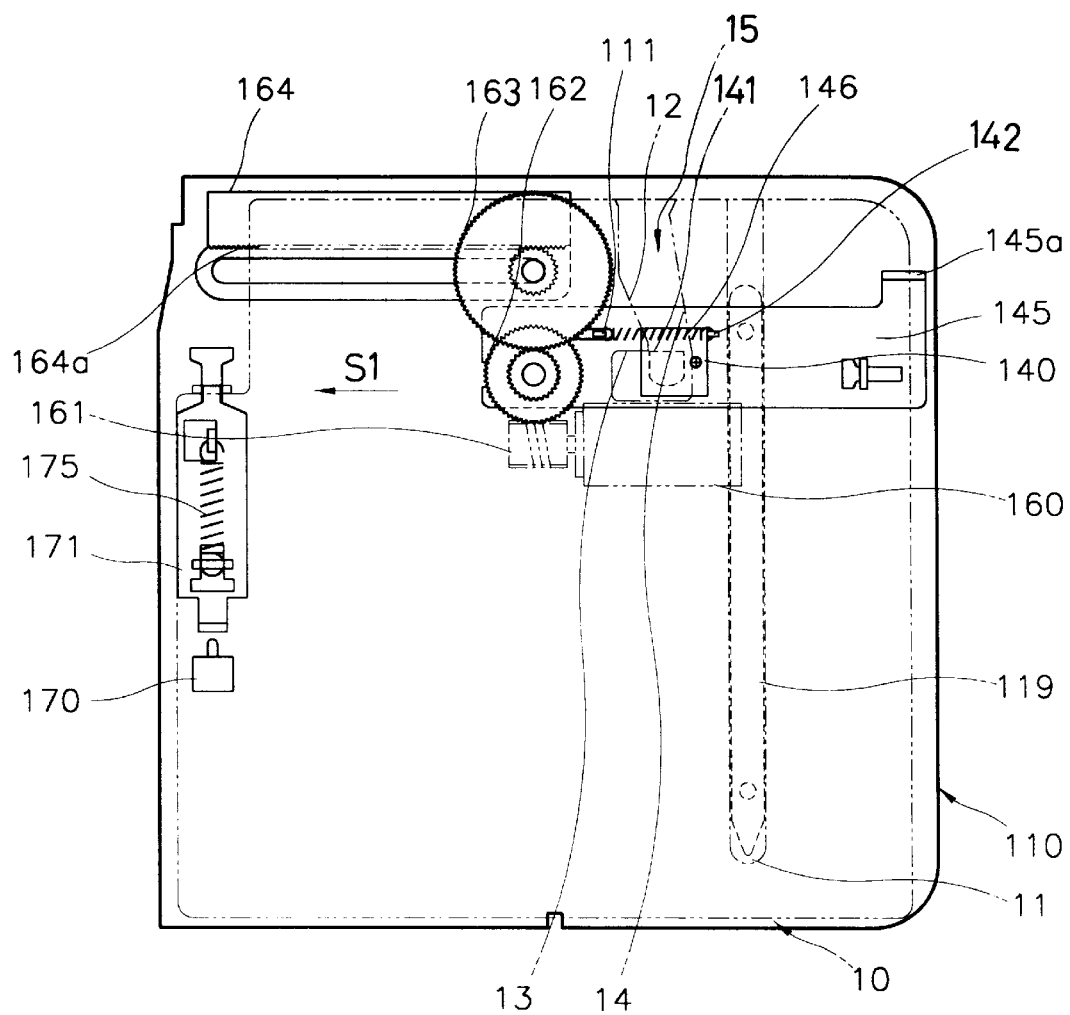
Figure 8:
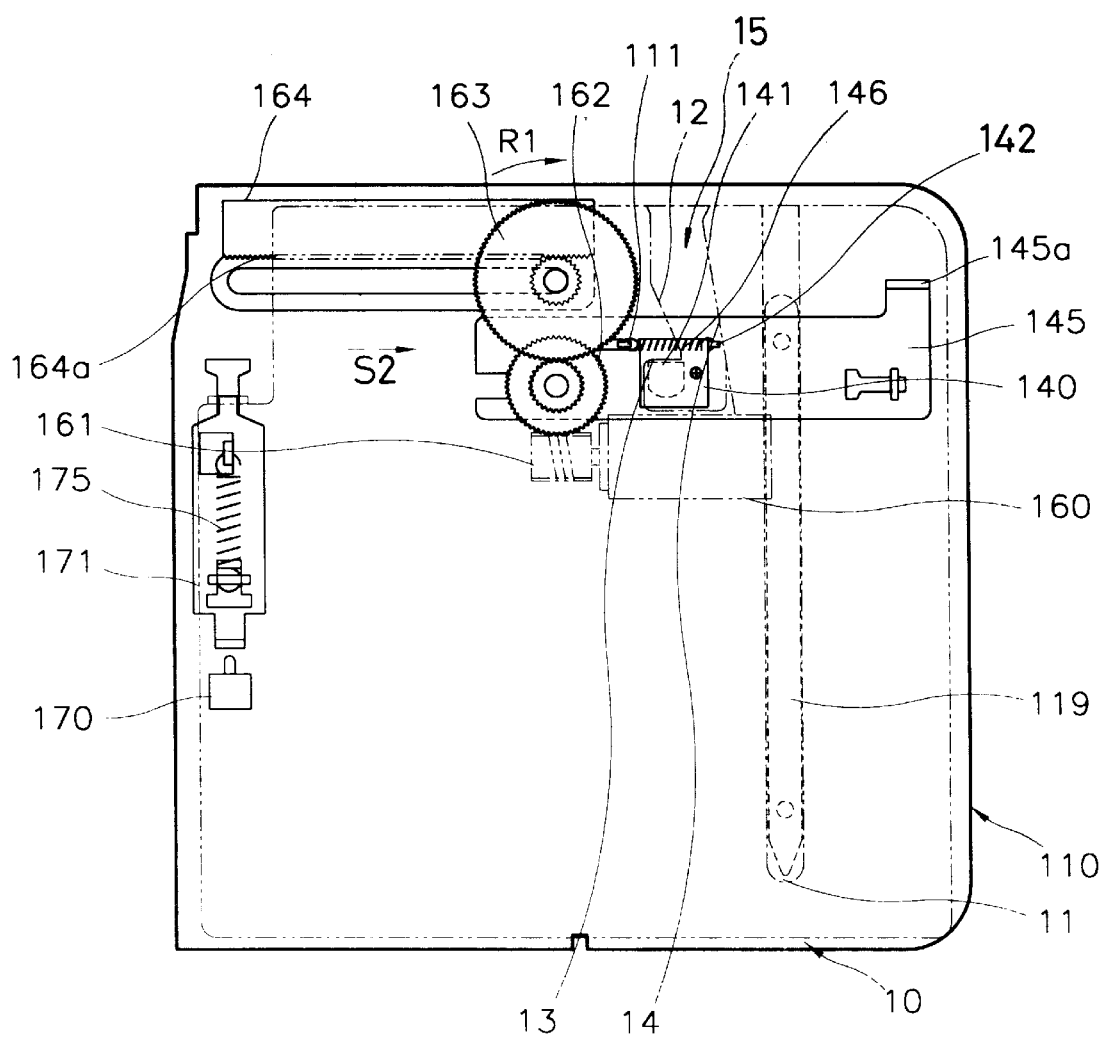
Figure 9:
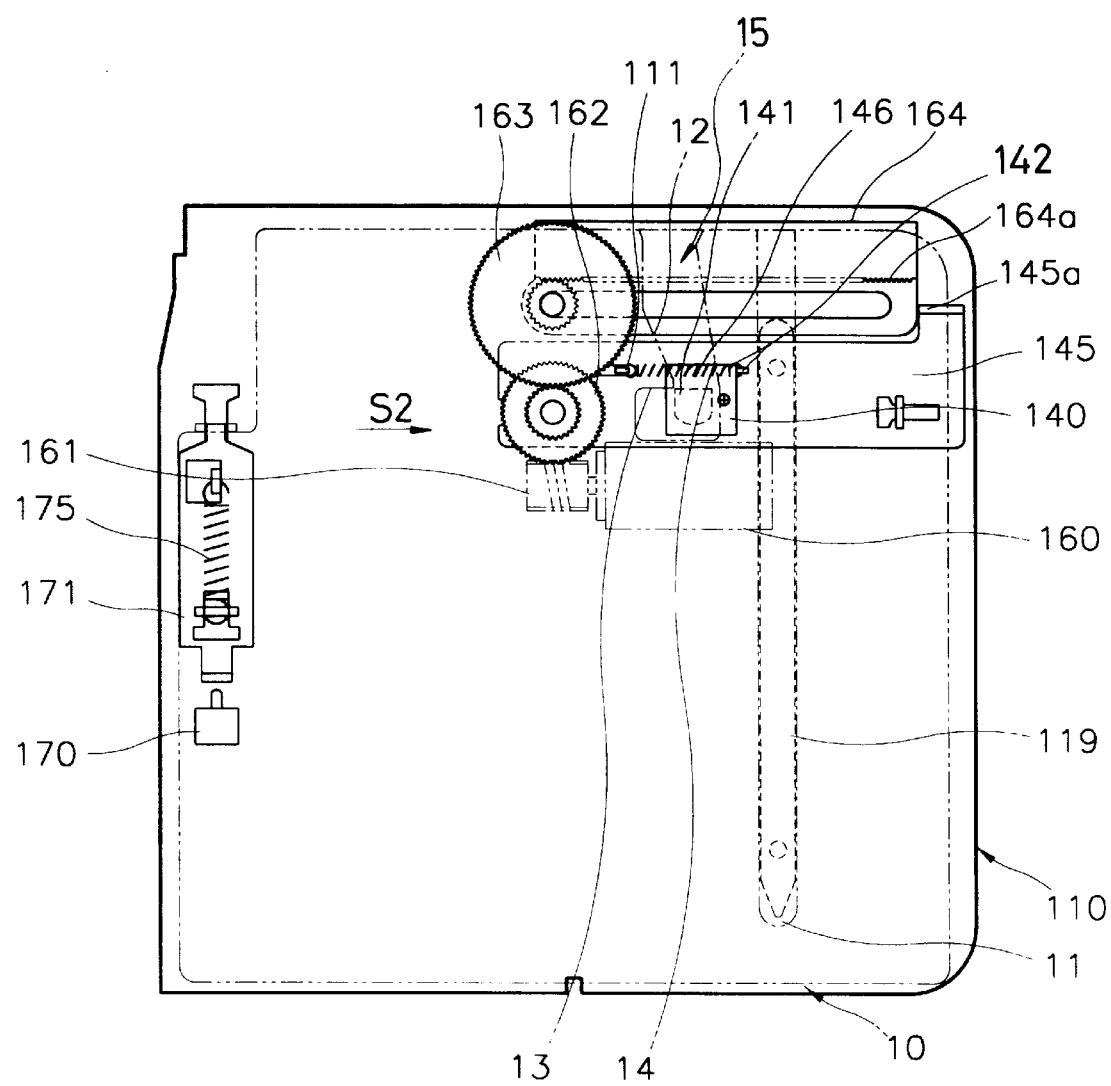

When the magazine is completely inserted, the slide member 145 moves in the direction S2 as shown in FIGS. 7 and 8. Here, the locking protrusion 141 is placed in the locking groove 13 by a restoring force of the spring 146 and thus the magazine 10 does not eject from the disk player. Therefore, the magazine 10 is completely loaded in the disk player.

After the magazine 10 is completely inserted, the reproducing mechanism 120 (see FIG. 1) draws out a selected tray 20 from the magazine 10 and reproduces information recorded on the disk 30 placed on the tray 20.

In the meantime, when it is required to eject the magazine 10 from the frame 110 of the disk player in order to exchange disks, the pinion 163 is rotated by the motor 160 via the worm 161 and the worm wheel 162 in a direction R1 as shown in FIG. 8. Thus, the slide rack member 164 is moved in the direction S2 by the rack 164 engaged with the pinion 163. As the slide rack member 164a moves further, the slide rack member 164 moves the slide member 145 by contacting a protruding portion 145a of the slide member 145. Accordingly, the locking protrusion 141 separates from the locking groove 13 of the cam groove 15 so that the magazine 10 is released. At this time, the magazine 10 is ejected from the frame 110 by the restoring force of the eject spring 156 (see FIGS. 1 and 5).

Figure 10:
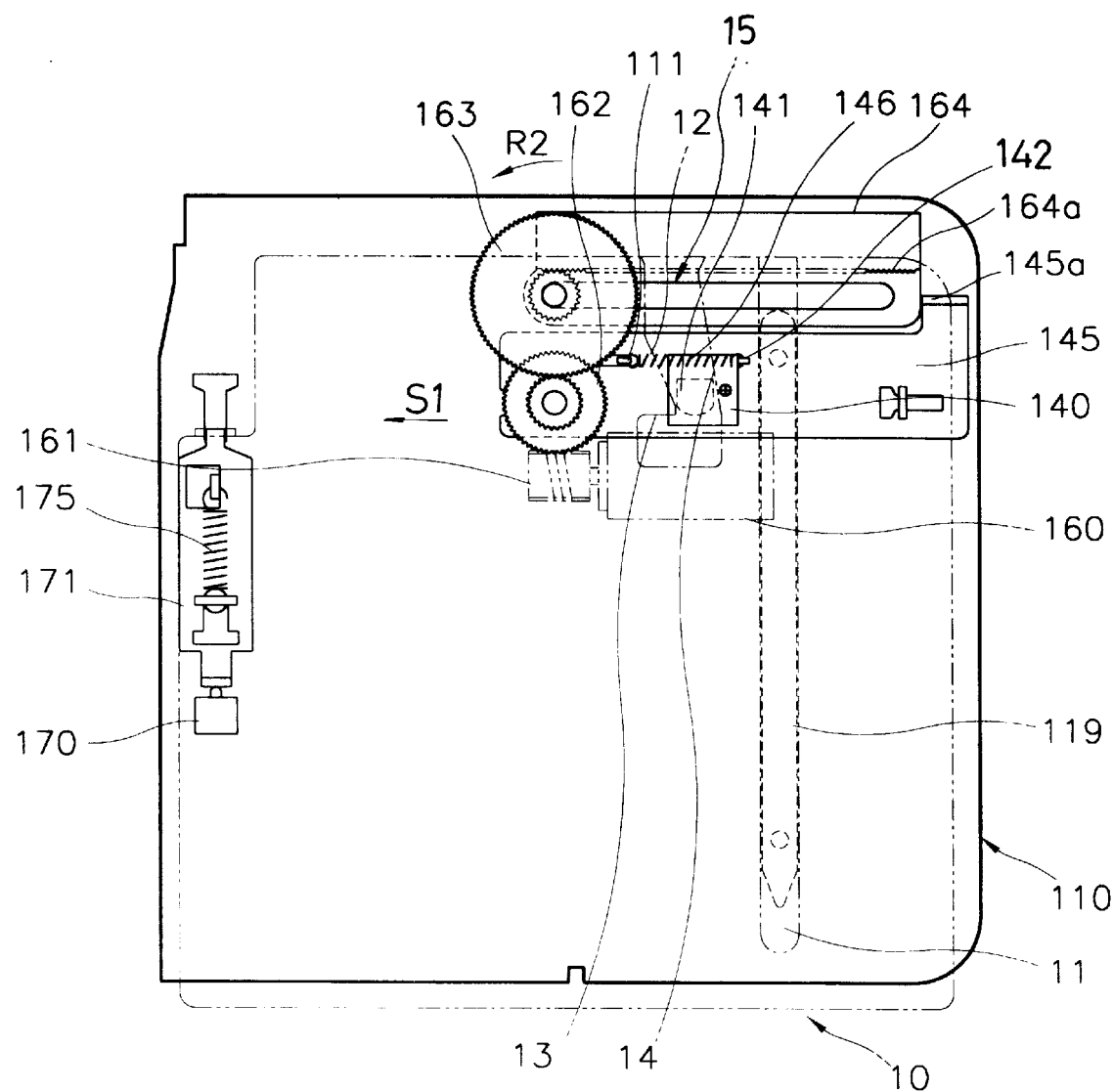

After the magazine 10 is ejected a predetermined distance, the locking protrusion 141, as shown in FIG. 10, contacts the second angled portion 14 of the cam groove 15 formed on the bottom surface of the magazine 10 and the operation of ejecting the magazine 10 pauses for a moment.

During such a process, the switch operating member 171 separated from the switch 170 is moved by the restoring force of the spring 175 to push the switch 170 as the magazine 10 is ejected. Accordingly, the motor 160 is driven by the operation of the switch 170 to rotate the pinion 163 in the reverse direction R2. Thus, the slide rack member 164 moves in the direction S1 and the slide member 145 retracted by the slide rack member 164 is moved by the restoring force of the spring 146 in the direction S1.

Figure 11:
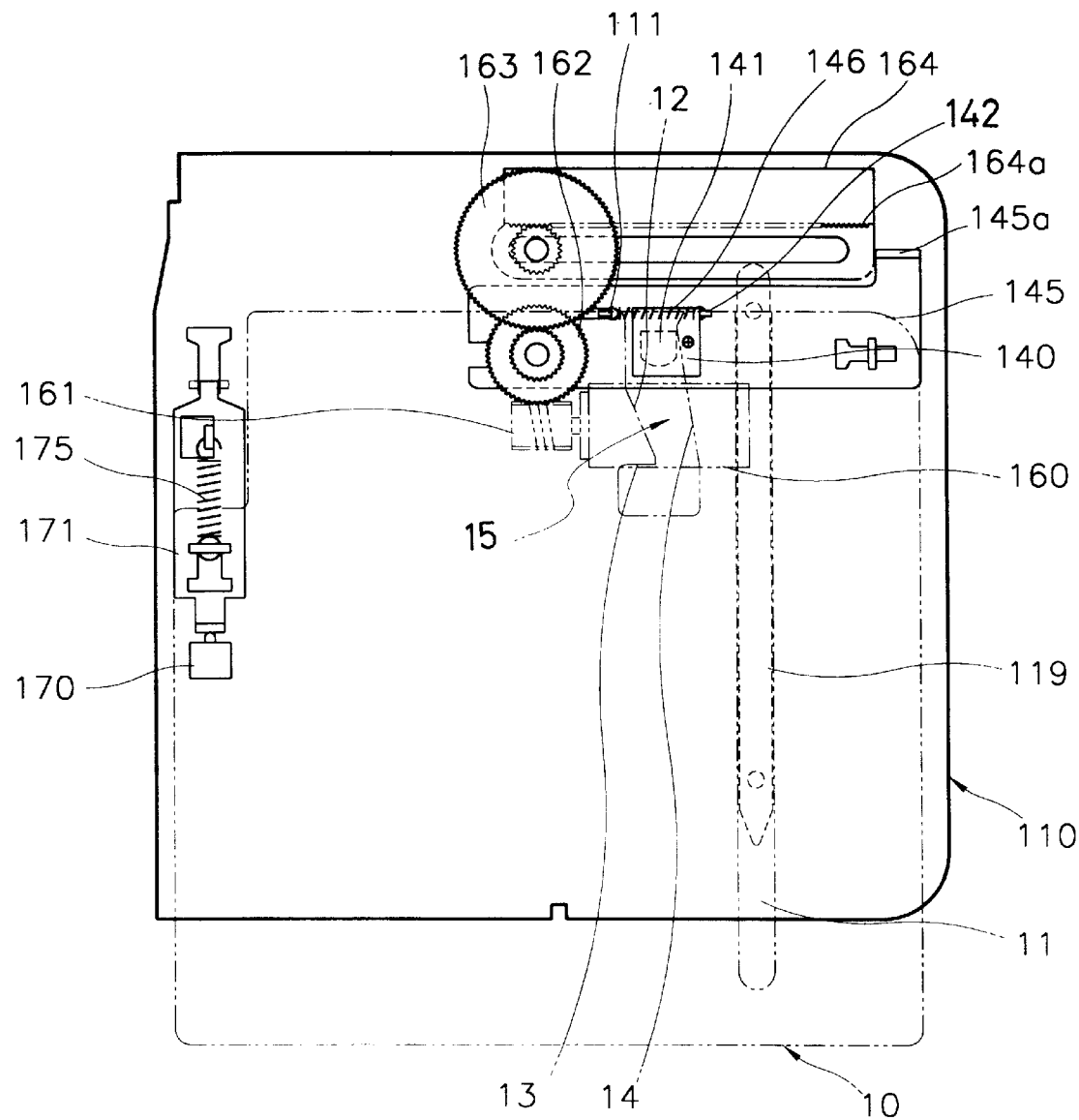

As shown in FIG. 11, as the slide member 145 is moved, the locking protrusion 141 preventing the ejection of the magazine 10 slowly slides according to the second angled portion 14. Then, the magazine 10 is ejected from the frame 110 by the restoring force of the ejecting spring 156.

Since the locking protrusion 141 of the stopper 140 while moving slowly together with the slide member 145 continuously contacts the second angled portion 14 of the cam groove 15 during the ejection of the magazine 10, abrupt ejection of the magazine 10 is prevented.

Figure 12:
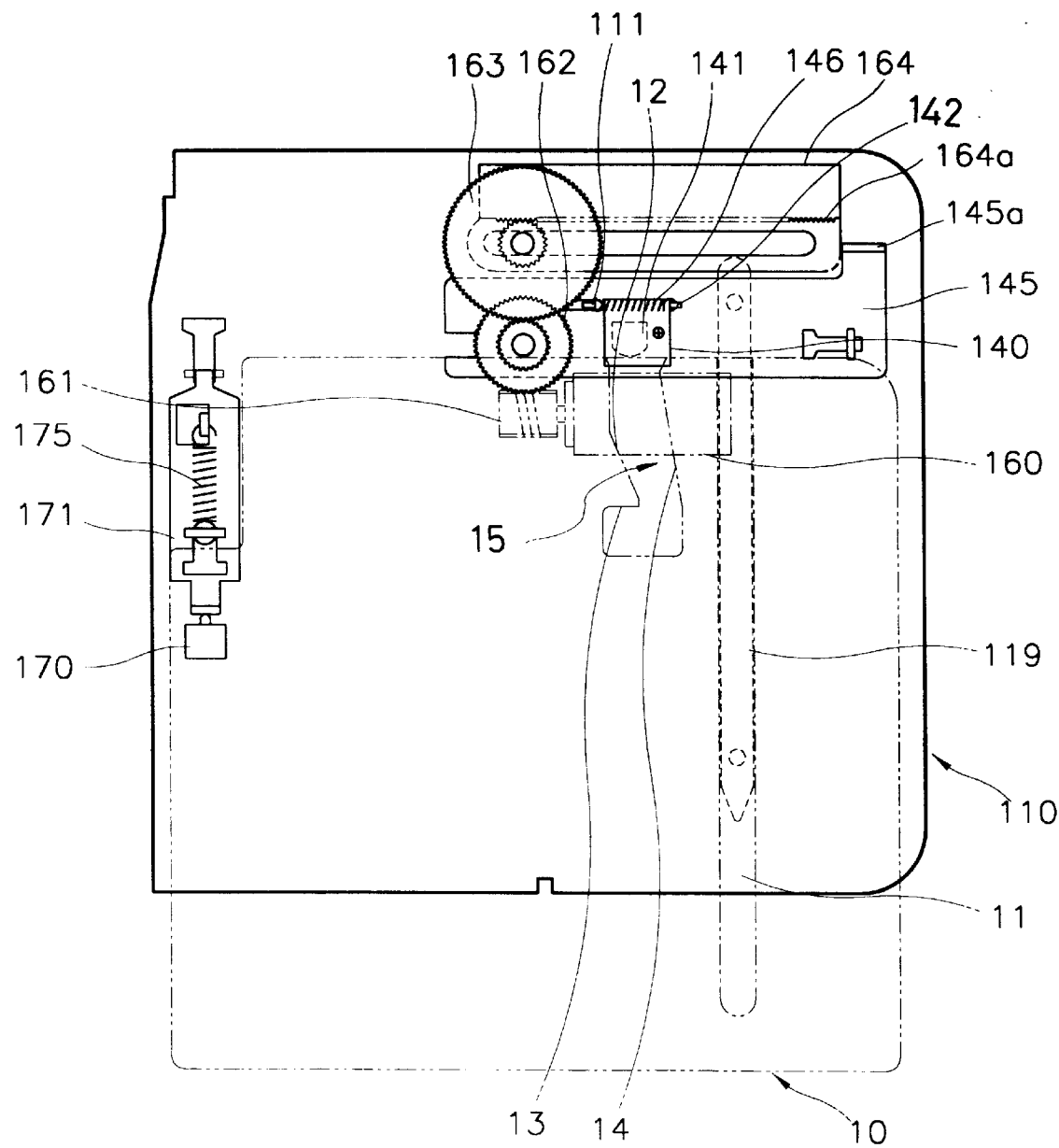

When the magazine 10 is ejected as shown in FIG. 12, abrupt ejection of the magazine 10 can be further prevented since the restoring force of the ejecting spring 156 is sharply reduced.

As described above, according to the present invention, an additional sensor detecting the insertion state of the magazine and a stopper mechanism are not required since the magazine is automatically locked when being inserted into the disk player. Further, abrupt ejection of the magazine can be prevented as the locking protrusion slides along the angled portion of the cam groove formed on the magazine, without an additional dumping mechanism.

What is claimed is:

1. A magazine loading and ejecting apparatus of a disk player for loading and ejecting a magazine accommodating a plurality of disks in and out of a disk player main body, comprising:

a stopper having, a locking protrusion and being installed in said disk player main body to be capable of reciprocating perpendicular to a direction said magazine is inserted;

a cam groove formed on one of an upper and lower surface of said magazine, said cam groove dimensioned to receive said stopper during insertion of said magazine into said disk player main body, said cam groove having a first angled portion along which said locking protrusion slides in contact therewith when said magazine is inserted in said disk player main body and a locking groove into which said locking protrusion is inserted and locked when said magazine is completely inserted into said disk player main body;

a spring which elastically biases said stopper in one direction;

an ejection unit which ejects said magazine from said disk player main body; and said cam groove further having a second angled portion along which said locking protrusion slides in contact therewith when said magazine is ejected from said disk player main body, and wherein, when said locking protrusion slides along said first angled portion of said cam groove during the insertion of said magazine, said stopper moves in the reverse direction with respect to said one direction and is inserted in said locking groove by a restoring force of said spring, and when said locking protrusion slides along said second angled portion during the ejection of said magazine, said stopper moves in said one direction so that said magazine is ejected.

2. The magazine loading and ejecting apparatus of a disk player as claimed in claim 1, wherein said ejection unit comprises:
   a motor;
   a slide rack member, installed in said disk player main body to be capable of reciprocating by a driving force of said motor, for moving said stopper to enable said locking protrusion to be separated from said locking groove;
   an ejector, installed in said disk player to be capable of reciprocating in directions said magazine is inserted and ejected, and retreating by being pushed by a leading edge of said inserted magazine in the direction said magazine is inserted; and
   an ejecting spring which elastically biases said ejector in the direction said magazine is ejected.

3. The magazine loading and ejecting apparatus of a disk player as claimed in claim 2, further comprising:
   a switch which operates said motor; and
   a switch operating member which operates said switch by selectively contacting said switch by being pushed by said leading edge of said inserted magazine.

4. The magazine loading and ejecting apparatus of a disk player as claimed in claim 1, farther comprising a slide member coupled with said stopper, which is installed in said disk player main body to be capable of reciprocating perpendicular to said direction of inserting said magazine.

5. The magazine loading and ejecting apparatus of a disk player as claimed in claim 4, wherein said ejection unit comprises:
   a motor;
   a slide rack member, installed in said disk player main body to be capable of reciprocating by a driving force of said motor, for moving said slide member to enable said locking protrusion to be separated from said locking groove;
   an ejector, installed in said disk player main body to be capable of reciprocating in directions said magazine is inserted and ejected, and retreating by being pushed by a leading edge of said inserted magazine in the direction said magazine is inserted; and
   an ejecting spring for elastically biasing said ejector in the direction said magazine is ejected.

6. The magazine loading and ejecting apparatus of a disk player as claimed in claim 4, further comprising:
   a switch which operates said motor; and
   a switch operating member which operates said switch by selectively contacting said switch by being pushed by a leading edge of said inserted magazine.

7. A compact disk player, which comprises:
   a disk player main body including a frame having a magazine receiving opening;
   a magazine for accommodating a plurality of compact disks, said magazine reciprocally moveable along an axis of movement between a load position wherein said magazine is at least partially received within said magazine receiving opening of said disk player main body and an eject position wherein said magazine is removable from said magazine receiving opening, said magazine including a magazine outer casing having upper and lower surfaces, one of said upper and lower surfaces having a groove defined therein and extending to an entry end of said magazine, said groove defining a locking groove portion;
   a magazine locking mechanism for releasably locking said magazine in said load position, said locking mechanism including a lockout member mounted to said frame of said disk player main body and receivable within said groove of said one of said upper and lower surfaces of said magazine outer casing, said lockout member movable relative to said frame between a locked position received within said locking groove portion of said magazine outer casing to retain said magazine in said load position and an unlocked position released from said locking groove portion to permit movement of said magazine to said eject position;
   a lockout spring operatively engageable with said lockout member and adapted to normally bias said lockout member to said locked position thereof;
   said groove of said one of said upper and lower surfaces defining a first cam surface arranged at an oblique angle relative to said axis of movement of said magazine, said first cam surface dimensioned to engage and move said lockout member of said locking mechanism to said unlocked position against the bias of said lockout spring during insertion of said magazine; and
   a reproducing mechanism mounted to said frame of said disk player main body for reproducing information stored on a compact disk.

8. The compact disk player of claim 7 wherein said disk player main body includes an ejector mounted to said frame and reciprocally moveable along said axis of movement of said magazine, said ejector including an ejector spring to normally bias said magazine to said eject position thereof.

9. The compact disk player of claim 7, wherein said groove of said one of said upper and lower surfaces defines a second cam surface arranged at an oblique angle relative to said axis of movement of said magazine, said second cam surface dimensioned to engage said lockout member of said locking mechanism during movement of said magazine to said eject position to resist movement of said magazine toward said eject position.

10. The compact disk player of claim 9 including a motor mounted to said frame of said disk player main body and operatively connected to said lockout member of said locking mechanism, said motor actuable in a first mode of operation to move said lockout member to said unlocked position thereof when said magazine is in said load position thereof.

11. The compact disk player of claim 10 including a slide member slidably mounted to said frame of said disk player main body, said slide member operatively connectable to said motor and engageable with said lockout member to move said lockout member to said unlocked position upon activation of said motor in said first mode of operation.

12. The compact disk player of claim 11 further including a switch mounted to said frame of said disk player main body, said switch positioned to be operatively engaged by said magazine during movement thereof to said eject position and adapted to switch said motor to a second mode ofoperation to move said slide member to a disengaged position with respect to said lockout member.

* * * * *